May 30, 1944. J. EHRET, JR 2,350,220
CHUCK UNIT PARTICULARLY ADAPTED FOR STEM MAKING MACHINES
Filed March 29, 1941
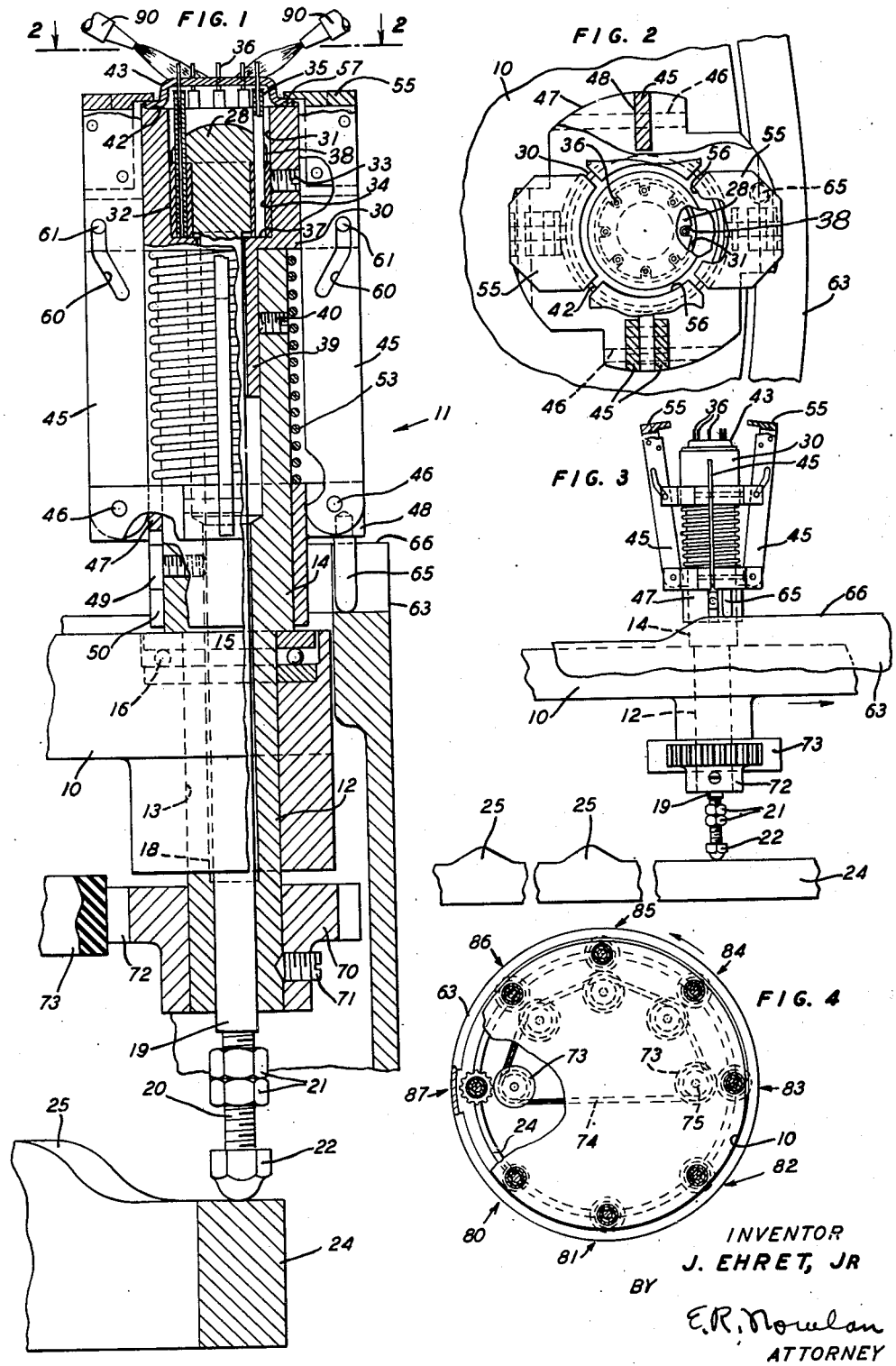
INVENTOR
J. EHRET, JR
BY
E. R. Nowlan
ATTORNEY Patented May 30, 1944

2,350,220

UNITED STATES PATENT OFFICE 2,350,220

CHUCK UNIT PARTICULARLY ADAPTED FOR STEM MAKING MACHINES

John Ehret, Jr., Trenton, N. J., assignor to Western Electric Company, Incorporated, New York, N. Y., a corporation of New York Application March 29, 1941, Serial No. 385,813

6 Claims. (Cl. 49—2)

This invention relates to chuck units particularly adapted for stem making machines.

The term "stem" defines the glass members of incandescent lamps, vacuum tubes, photoelectric cells or the like in which are held the supporting wires for the filaments, grids, and other electrical elements. The number of supporting wires and their relative spacing, in addition to the size and contour of the finished article, determine the size and shape of the glass portion of the stem structure.

An object of the invention is to provide highly efficient chuck units for use in stem making machines and particularly adapted for dished glass stems.

With this and other objects in view, the invention comprises a chuck unit adapted to singly receive dished glass members and supporting wires for the making of stems, the chuck unit including holding elements to removably hold the glass members against displacement and a plunger reciprocally relative to the glass members during the application of heat thereto in fusing the glass about the wires to maintain the shape of the glass members.

Other objects and advantages will be apparent from the following detailed description when taken in conjunction with the accompanying drawing, wherein Fig. 1 is a vertical sectional view of one of the chuck units of the machine;

Fig. 2 is a top plan view of the chuck unit taken substantially along the line 2—2 of Fig. 1 with portions thereof broken away;

Fig. 3 is a side elevational view of the chuck unit shown in open position and illustrating the associated cams, and Fig. 4 is a schematic top plan view of a portion of the stem making machine.

Referring now to the drawing, attention is first directed to Fig. 1, which illustrates a turret 10 with one of the chuck units indicated generally at 11. It will be apparent, by viewing Fig. 4, that in the present embodiment there are eight chuck units equally spaced about the turret, but as these chuck units are identical in structure a description of only one is thought necessary to clearly illustrate the invention. The chuck unit 11 has a hollow body member 12 rotatably disposed in a vertical aperture 13 of the turret and provided with an enlarged upper portion 14, which provides a shoulder 15 to rest upon a bearing 16 in the turret. A longitudinal opening 18 in the body 12 movably receives a plunger 19. The lower end of the plunger is threaded as at 20, receiving adjustable stop nuts 21 and a cam engaging nut 22. The nut 22 is positioned to ride upon a circular cam 24 extending concentrically about the axis of the machine beneath the clutch units as illustrated in Fig. 4. The cam 24 is formed with a plurality of high portions 25 disposed at definite spaced positions to cause reciprocation of the plunger 19 at definite intervals during each cycle of the machine operation.

A head portion 28 is formed integral with the upper end of the plunger 19 and is of a somewhat semi-spherical contour. The head portion 28 is movably disposed in a support 30, which is hollowed at 31 to receive the head portion and to receive also an annular member 32, which is held in place and secured to the support by a set screw 33. The annular member 32 has a plurality of vertical apertures 34 disposed therein at equally spaced positions, as illustrated in Fig. 2, to receive tubular members 35, the latter projecting upwardly from the annular member to receive supporting wires 36 of stems to be formed. Tubular members 35 rest upon a surface 37 of the support 30, this surface also serving as a stop and a support for the wires 36. As illustrated in Figs. 1 and 2, the head portion 28 has a series of equally spaced notches 38 in its periphery for the tubular members 35 to allow the head portion to straddle the tubular members and move relative thereto. By viewing Fig. 1, it will be observed that the support 30 has a reduced portion 39 projecting into an enlarged portion of the opening 18 in the body member 12, concentric with the plunger 19, where a set screw 40 secures this portion with the support to the body member 12. Attention is now directed to the upper portion of the support 30, which is recessed as at 42 to receive a dished glass member 43, the latter to become a part of a stem assembly with the supporting wires 36.

Means is provided to hold the glass member 43 in the recess of the support during the forming of the stem and to release the glass member after the forming operation has been completed. This holding means consists of a plurality of holding members in the form of pivoted arms 45 disposed at spaced positions about the body 12. In the present instance, there are four arms each pivoted at its lower end, as at 46, to an element 47, the latter being slidably disposed upon the body and notched, as at 48, to receive the pivots 46. A key 49, carried by the body 12 and receivable in an elongate slot 50 in the element 47, serves to allow reciprocation of the element but to hold the element against rotation relative to the body.

A spring 53, disposed concentric with the body 12, is positioned between the support 30 and the element 47 to normally urge the element downwardly. The upper ends of the arms 45 are secured to article engaging members 55 of the contour illustrated in Figs. 1 and 2. These members have arcuate portions 56 conforming somewhat to the contour of the glass member 43 to project over a flanged portion 57 of the glass member to hold the glass member in recess 42. The arms 45 are also provided with cam grooves 60 of the contour illustrated in Fig. 1 and in which are disposed pins 61 carried by projections of the support 30 to control movement of the arms during vertical movement of the element 47. The vertical movement of the element 47 is caused by a cam 63 disposed concentric with the cam 24, as illustrated in Figs. 3 and 4. A cam engaging member 65, in the form of a pin carried by the element 47, rides upon the cam 63 and, when moving upon a high portion 66 of the cam, the element 47 will be moved upwardly to cause actuation of the arms 45.

Attention is now directed to the lower portion of Fig. 1 and to Fig. 4, where a gear 70 is mounted upon the body 12 beneath the turret 10 and fixed to the body by the aid of a set screw 71. The gear 70 is provided with teeth 72 of any desired structure and positioned to be engaged by a resilient rotatable driving member 73, which, in the present instance, is a rubber wheel. Referring now to Fig. 4, attention is directed to the fact that there are five rubber wheels 73 disposed at spaced positions adjacent five stations to be successively assumed by each chuck unit during the travel of the latter intermittently through each cycle of the machine. The wheels 73 are driven through the aid of a common belt 74 connecting all of the wheels and their rotatable shafts with a driving shaft 75. The driving shaft 75 is connected operatively with a power means, not shown, to cause rotation of the chuck units during the rest periods of the turret.

During the operation of the machine, the turret 10 is rotated counterclockwise, Fig. 4, intermittently moving the chuck units from station to station. At stations indicated at 80 and 81, the arms 45 are in the open positions shown in Fig. 3 for the positioning of a glass member 43 in the recess 42 of the support 30 and the positioning of the supporting wires 36 in their tubular members 34. During this assembly of parts, the wires are fed through apertures previously formed in the glass member 43, which apertures align with the tubular members 34. At a station indicated at 82, the pin 65 rides downwardly off of the high portion 66 of the cam 63, allowing the force of the spring 53, together with the force of gravity, to move the element 47 downwardly, moving with it the arms 45 and their members 55. During the downward movement of the arms 45, the cams 60 and their respective pins 61 cause the arms to move inwardly to position the arcuate portions 56 of the members 55 over and in gripping engagement with the flange of the glass member 43. In this manner, the glass member is held in place during the five subsequent stations 83, 84, 85, 86 and 87. While the chuck units are located at the last mentioned stations, their gears 70 are disposed in engagement with the adjacent wheels 73 and, through this engagement, the body members, that is, the chuck units, in general, are caused to rotate. At each of these stations where the chuck units are rotated, heat is applied to the glass members 43 by suitable means, such as gas jets 90, illustrated in Fig. 1. Therefore, at the stations where the chuck units are rotated, the glass members 43 are heated to soften the glass and seal the wires 36 therein. The application of heat to glass members 43 of the contour illustrated softens the members, and without suitable means to prevent it, the central portions of these members will sag and thus become deformed. This condition is eliminated through the aid of the plunger 19 and its head portion 28. At definite intervals during the application of heat to the glass member of each unit, the plunger 19 thereof is reciprocated through the association of the nut 22 with the high portions 25 of the cam 24 to repeatedly move the head portion 28 to move the central portion of the glass member upwardly to its normal position. This operation of the plunger and its head portion takes place after each station 83, 84, 85, 86 and 87, the operation continuing after the latter station until the glass member has had sufficient time to cool and again solidify. In this manner, the contour of the glass member is maintained.

After each chuck unit leaves the position of the station 87, the pin 65 thereof is positioned to ride upon the high portion 66 of the cam 63, moving the element 47 upwardly against the force of the spring 53 and through the cams 60 and their pins 61 move the portions 55 first upwardly, free of the flanges 57, and then outwardly to the positions shown in Fig. 3, freeing the completed stem for removal by the operator.

The embodiment of the invention herein disclosed is merely illustrative and may be widely modified and departed from in many ways without departing from the spirit and scope of the invention as pointed out in and limited solely by the appended claims.

What is claimed is:

1. A chuck unit for a stem making machine comprising a body having a central opening, an annular element secured to the body within the opening for supporting a plurality of wires, means for removably holding a glass member so that the wires extend through apertures therein, a reciprocable plunger positioned within the annular element, and means for reciprocating the plunger to cause it to engage the under surface of the glass member at predetermined times.

2. A chuck unit for a stem making machine comprising a supporting means for holding in predetermined relationship a dish-shaped glass member and a plurality of wires extending through apertures in the dish portion of the glass, a plunger positioned beneath the dish portion of the glass and having a head with openings through which the wires pass, said plunger being positioned centrally of the supporting means, and means for moving the plunger to cause its head to engage the under surface of the dish portion of the glass to maintain its contour during the time it is softened by heat in a sealing-in operation.

3. A chuck unit for a stem making machine comprising a support for holding a plurality of wires within an opening thereof, means for removably clamping a glass member on the support so that each wire protrudes through an individual aperture in the glass member, a shaping head positioned within the opening of the support, and means for moving the head to cause it to engage the under surface of the glass member to maintain its original contour during the fusing of the glass to the wires.

4. A chuck unit for a stem making machine comprising a support having a central opening, means for holding the rim of a dished glass member on the support over the opening, means within the opening of the support for holding wires so that they project through apertures in the dished portion of the glass member, means positioned within the central opening of the support and movable into engagement with the underside of the glass member to maintain the original contour of the member when heat is used to seal the glass to the wires, and means for moving the holding means away from the support to free the glass member and the wires secured thereto.

5. A chuck unit for a stem making machine comprising a body having a central opening, means for holding a plurality of wires in predetermined positions in said opening, a seat provided in the body above the central opening for supporting a dished glass member over the opening so that the wires extend through apertures in the glass member, means for holding the glass member in the seat, means movable in the central opening to repeatedly engage the glass member to maintain a predetermined contour during the fusing of the glass to the wires, means to move the holding means upwardly from the body to free the glass member and the wires sealed thereto, and means for causing lateral movement of the holding means away from the body during the upward movement thereof.

6. A chuck unit for a stem making machine comprising a hollow body having a seat formed thereon to support a dished glass member over an open end of the body, tubes disposed in the body for supporting wires to be sealed in the glass member, a plurality of holding elements for holding the glass member in the seat, arms for supporting the holding elements, and a ring secured to the arms and movable axially of the body to move the arms and the holding elements toward and away from the glass member.

JOHN EHRET, JR.